United States Patent [19]

Mischenko

[11] 4,429,963
[45] Feb. 7, 1984

[54] SLIDE TRANSFER AND SHUTTER CONTROL ARRANGEMENT FOR SLIDE PROJECTOR

[75] Inventor: Nicholas Mischenko, Mt. Prospect, Ill.

[73] Assignee: Bell & Howell Company, Chicago, Ill.

[21] Appl. No.: 336,470

[22] Filed: Dec. 31, 1981

[51] Int. Cl.³ .............................................. G03B 23/00
[52] U.S. Cl. ......................................... 353/88; 353/92
[58] Field of Search ................... 353/88, 92, 117, 103, 353/111, 115, 116

[56] References Cited

U.S. PATENT DOCUMENTS

| | | | |
|---|---|---|---|
| 2,960,004 | 11/1960 | Jungjohann | 353/92 |
| 3,138,062 | 6/1964 | Maiershofer | 353/88 X |
| 3,353,443 | 11/1967 | Hall | 353/15 |
| 3,411,845 | 11/1968 | Pester | 353/88 |
| 3,781,103 | 12/1973 | DiPietro | 353/117 X |
| 3,876,298 | 4/1975 | Hickey | 353/88 |
| 4,118,280 | 10/1978 | Charles et al. | 353/117 X |
| 4,130,353 | 12/1978 | Henkelmann et al. | 353/92 X |
| 4,200,368 | 4/1980 | Houseknecht | 353/88 |

Primary Examiner—Harry N. Haroian
Attorney, Agent, or Firm—James V. Lapacek; Robert J. Schneider; Roger M. Fitz-Gerald

[57] ABSTRACT

A slide transfer and shutter control arrangement is provided for a slide projector including a simplified shutter control arrangement and a positive acting slide sensor arm that is slidably mounted for shifting translation. Slide transfer is accomplished by a vertically movable lifter arm operated by a level wind screw. The level wind screw also operates a cam actuator. The cam actuator moves up and down with the lifter arm to actuate a slider member. The slider member controls the position of the slide sensor arm and provides shutter latch control. The slide sensor arm retains the shutter in the closed position when no slide is present and the slider member is actuated by the cam actuator to release the shutter latch. When a slide is sensed by the slide sensor arm, the slide sensor arm releases the shutter for projection of the slide at the slide transfer station. Slide face tension is appropriately provided by a face tension arrangement under the control of the cam actuator. A tray lock release arrangement cooperates with operation of the slide transfer and shutter control arrangement.

15 Claims, 7 Drawing Figures

SLIDE TRANSFER AND SHUTTER CONTROL ARRANGEMENT FOR SLIDE PROJECTOR

BACKGROUND OF THE INVENTION

A. Field of the Invention

The present invention relates generally to the field of slide projector apparatus and more particularly to an improved slide transfer and shutter control arrangement for slide projector apparatus.

B. Description of the Prior Art

Various slide transfer and shutter control arrangements have been proposed by the prior art to control the transfer of slides between a slide tray and a projection station and to control the opening and closing of a shutter to selectively project the slide at the projection station. For example, slide transfer and shutter control arrangements are disclosed in the following U.S. Pat. Nos.: 4,200,368; 3,334,544; 3,411,845; 3,876,298; 3,353,443; 3,138,062; 4,130,353; 3,180,212; 2,871,760; 3,412,495; 2,978,823; 3,228,132; 3,023,669; 3,644,029; 3,572,920; 3,938,886; 3,644,028; 3,856,391; 3,721,494; 3,677,631; 3,924,942; 3,907,414; 3,895,864; 3,408,139; 3,343,454; and 3,652,155.

Specifically, slide transfer and shutter control arrangements utilizing a slide sensor that functions to assist in the control of a shutter are disclosed in the aforementioned U.S. Pat. Nos. 4,200,368; 3,876,298; 3,411,845; 3,138,062; 3,334,544; 2,978,823; 3,180,212; and 4,130,353.

While the arrangements of the prior art are generally suitable for their intended use, it would be desirable to provide an improved slide transfer and shutter control arrangement that utilizes a more positive acting slide sensor and a more simplified shutter control arrangement.

For example, the aforementioned U.S. Pat. No. 4,200,368 to Househnecht utilizes a pivotally mounted slide feeler 113 and latch member 110 and utilizes shutter control elements 90, 98 interacting with the latch member 110 at 116 to control operation of the shutter. While this arrangement could apparently be suitable for its intended use, it would be desirable to provide an improved slide transfer and shutter control arrangement that avoids the use of a pivotally mounted slide sensor and provides more positive slide sensing action and further provides direct shutter control by the slide sensor in a simplified arrangement.

SUMMARY OF THE INVENTION

Accordingly, it is a principal object of the present invention to provide a slide transfer and shutter control arrangement for a slide projector that avoids one or more of the drawbacks of the prior art and that provides a positive acting slide sensor and a simplified shutter control arrangement.

It is another object of the present invention to provide a slide transfer and shutter control arrangement for a slide projector including a slide sensor arm that provides side tension to a projected slide, that senses by slide width dimension the presence of a slide at a projection station, and directly controls the positioning of a shutter in accordance with the presence or absence of a slide.

It is a further object of the present invention to provide a slide transfer and shutter control arrangement for a slide projector including an arrangement for sensing the presence or absence of a slide having a slide width sensor arm that is slidable mounted for translation and that provides positive slide sensing action.

It is yet another object of the present invention to provide a slide tray lock mechanism in cooperative relationship with a slide transfer arrangement that unlocks the slide tray to allow slide tray movement when the slide tray is in a predetermined position and that is conditioned to unlock the slide tray in response to operation of the slide transfer arrangement.

Briefly, in accordance with important aspects of the present invention there is provided a slide transfer and shutter control arrangement for a slide projector having a simplified shutter control arrangement and a positive acting slide sensor arm that is slidably mounted for shifting translation. Slide transfer is accomplished by a vertically movable lifter arm operated by a level wind screw. The level wind screw also operates a cam actuator. The cam actuator moves up and down with the lifter arm to actuate a slider member. The slider member controls the position of the slide sensor arm and provides shutter latch control. The slide sensor arm retains the shutter in the closed position when no slide is present and the slider member is actuated by the cam actuator to release the shutter latch. When a slide is sensed by the slide sensor arm, the slide sensor arm releases the shutter for projection of the slide at the slide transfer station. Slide face tension is appropriately provided by a face tension arrangement under the control of the cam actuator. A tray lock release arrangement cooperates with operation of the slide transfer and shutter control arrangement.

BRIEF DESCRIPTION OF THE DRAWING

The invention, both as to its organization and method of operation, together with further objects and advantages thereof, will best be understood by reference to the following specification taken in connection with the accompanying drawing in which.

DETAILED DESCRIPTION OF THE PREFERRED EMBODIMENT

Figure 1:
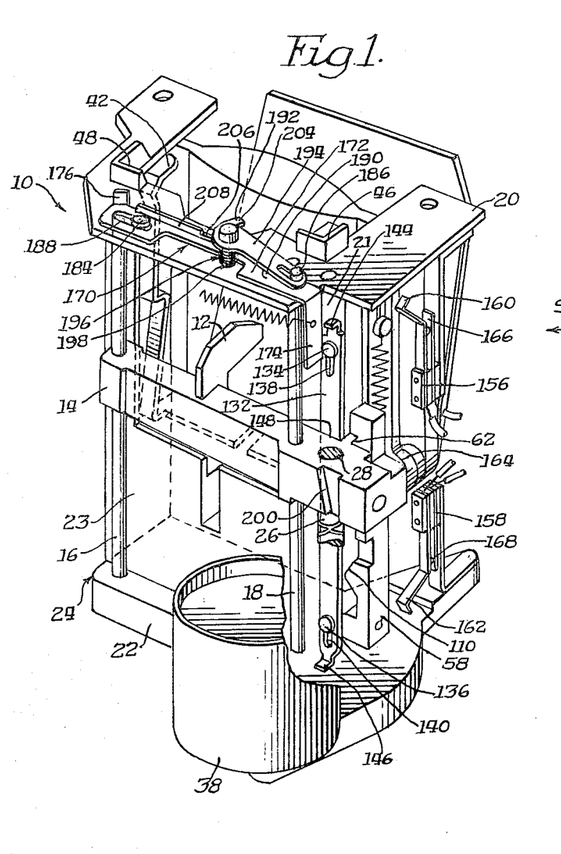
FIG. 1 is a perspective view of the slide transfer and shutter control arrangement of the present invention with parts removed and cut away for clarity.

Referring now to FIG. 1, the slide transfer and shutter control arrangement 10 of the present invention is provided for use with slide projector apparatus to transfer slides between a slide tray position of a slide tray carried by the slide projector apparatus and a projection position and to appropriately control the positioning of a shutter between open and closed positions. Reference may be made to U.S. application Ser. No. 336,523 filed by R. Parker et al on Dec. 31, 1981 for illustration of one type of slide projector apparatus with which the slide transfer and shutter control arrangement 10 may be utilized. Further, reference may be made to the aforementioned application Ser. No. 336,523 for a more detailed discussion of the control of the slide transfer and shutter control arrangement 10 by the slide projection apparatus for slide projection operation.

The slide transfer and shutter control arrangement 10 includes a lifter arm 12 which may also be referred to as a slide ejector and a support frame generally referred to at 24. The lifter arm 12 is provided as an extending poriton of a drive arm 14. The drive arm 14 is slidably supported for vertical movement by two support rods 16, 18 that extend through cooperating passages formed through the drive arm 14. The support rods 16, 18 are supported between an upper platform portion 20 and a base portion 22 of the support frame 24. The support frame 24 also includes upstanding left and right sidewall portions 21, 23 extending between the upper platform 20 and the base portion 22 to define a slide gate and a slide projection aperture 15.

Figure 2:
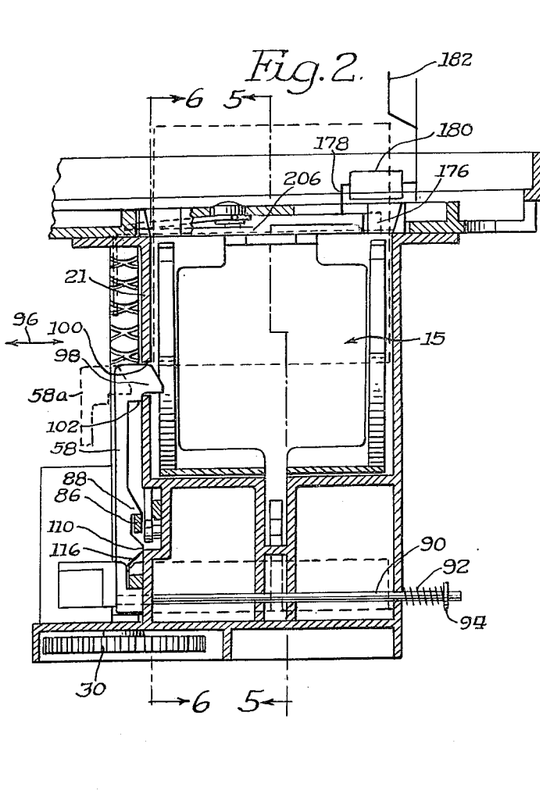
FIG. 2 is a sectional view of the slide transfer and shutter control arrangement of FIG. 3 taken generally along the line 2—2 of FIG. 3 and shown in operative relationship with portions of a slide projector.
Figure 3:
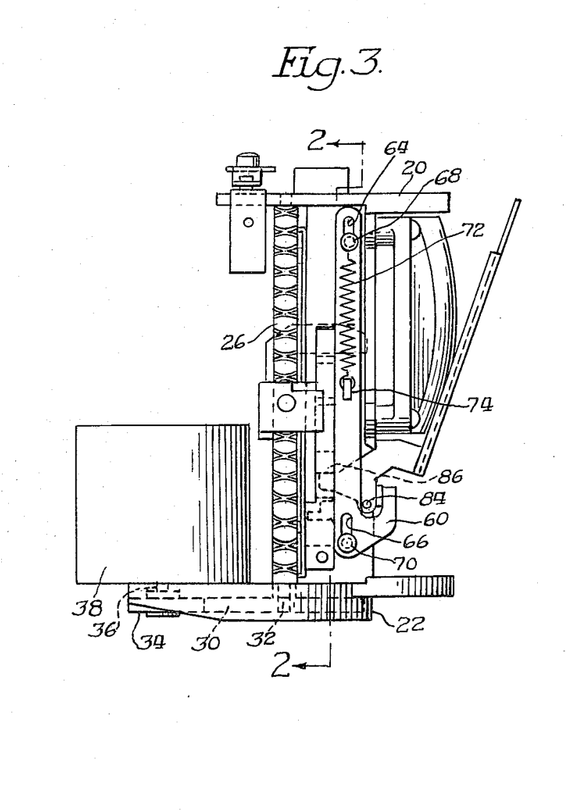
FIG. 3 is a right side elevational view of the slide transfer and shutter control arrangement of FIG. 1 and illustrating an operative position between the slide projection position and the slide elevated slide tray position.

The drive arm 14 is driven along a reciprocative, vertical path by a level wind screw 26. Referring now additionally to FIGS. 2 and 3, the level wind screw 26 is rotatably supported by the frame portions 20, 22 and can be more clearly seen in FIG. 3. The drive arm 14 includes a follower (not shown) that is disposed in a clearance passage 28 and that meshes with the threads of the level wind screw 26.

A first drive gear 30 (FIG. 3) is fixed to a lower extending shaft portion 32 of the level wind screw 26. The first drive gear 30 is meshed with and driven by a second drive gear 34 (FIG. 3) which is fixedly attached to a shaft 36 of a drive motor 38. The drive motor 38 is suitably controlled by the slide projector apparatus as is more fully described in the aforementioned U.S. application Ser. No. 336,523. The drive motor 38 of the slide transfer and shutter control arrangement 10 corresponds to the slide elevate motor 64 of the aforementioned application and operation of the lifter arm 12 corresponds to operation of the slide elevate mechanism 58 of that application. The drive motor 38 is controlled to rotate in one predetermined direction to rotate the level wind screw 26 in one direction. Thus, the operation of the level wind screw 26 operates as a reversible feed screw or endless worm arrangement from a unidirectional input similar in general respects to the drive arrangement U.S. Pat. No. 3,353,443.

To transfer slides between a slide tray position atop the slide transfer shutter control arrangement 10 and an operative projection position of the associated projector apparatus, the lifter arm 12 is driven from the lower position near the base 22 directly upward to an upper position adjacent the upper housing portion 20 to return the slide presently being projected to its respective slide tray position. Next the associated slide projector apparatus rotates the carried slide tray to the next slide position to be projected. Upon completion of the rotation and the stopping of the slide tray, the lifter arm 12 is lowered along with the next slide to be projected to the lower position to place the slide in the projection position. As the lifter arm 12 is lowered, the slide moves downward by gravity action as supported by the lifter arm 12.

Figures 4, 5:
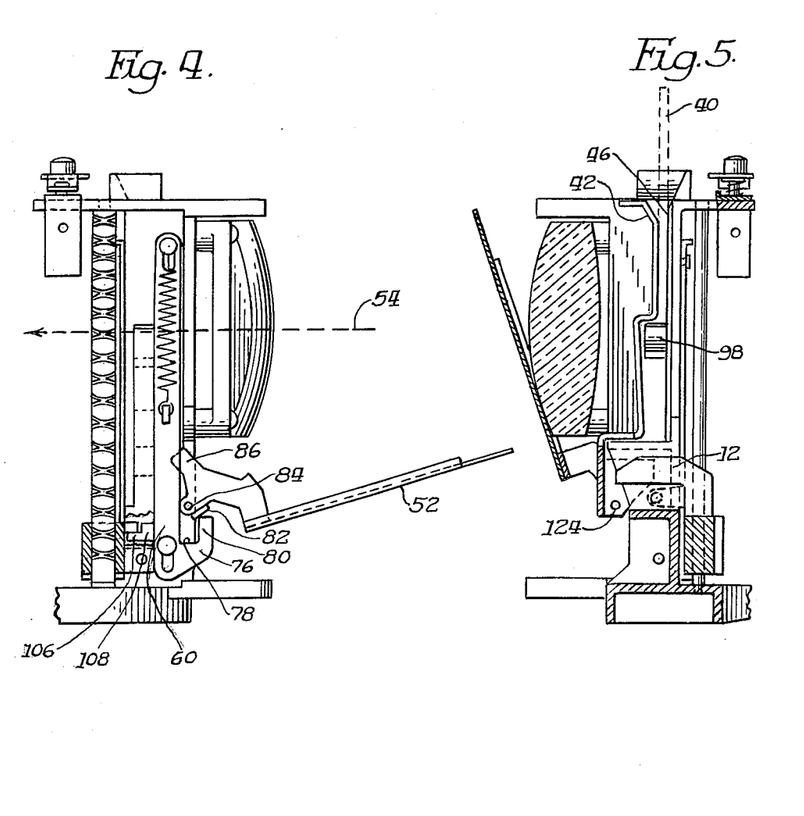
FIG. 4 is a right side elevational view similar to FIG. 3 and illustrating the operative position with a slide in the slide projection position and with the shutter open.
FIG. 5 is a sectional view of the slide transfer and shutter control arrangement of FIG. 1 taken generally along the line 5—5 of FIG. 2 and illustrating an operative position with a slide being returned to the slide tray after projection.
Figures 6, 7:
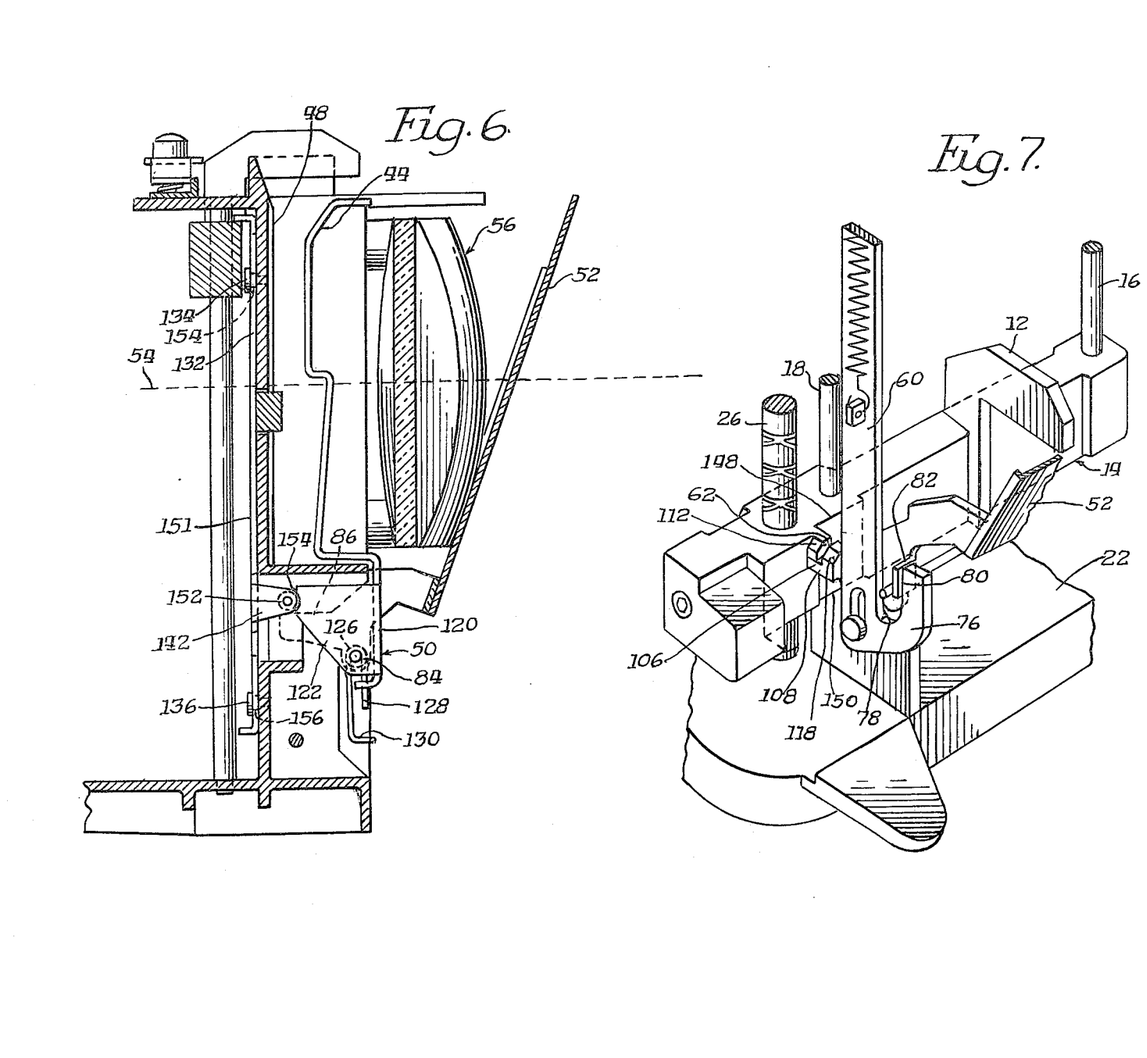
FIG. 6 is an enlarged sectional view taken generally along the line 6—6 of FIG. 2.
FIG. 7 is an enlarged perspective view of portions of the slide transfer and shutter control arrangement of FIG. 1.

Referring now additionally to FIGS. 5 and 6, a slide 40 is shown in phantom in FIG. 5 with the lifter arm 12 at an approximately mid-way position between the upper slide tray position and the lower projection position. Two guide channels 46, 48 are formed along the right and left side walls 21, 23 respectively to provide vertical guide surfaces for the vertical side edges of the slide 40. The guide channels 46, 48 provide general alignment of the slide 40 at the slide gate in the slide width direction and further provide face alignment of the slide 40 in the thickness direction of the slide 40 in cooperation with two face tension arms 42, 44.

As best seen in FIGS. 5 and 6, the face tensions arms 42, 44 are formed as extending portions of a face tension mechanism 50. The structure and operation of the face tension mechanism 50 will be explained in more detail hereinafter. Basically, the face tension arms 42, 44 are controlled to an open position of FIG. 6 when the slide 40 is being lowered from the slide position to the projection position. Further, the face tension arms 42, 44 are controlled to the closed face tension position of FIG. 5 to provide face tension to the slide 40 when the slide 40 is in the lower projection position and as the slide is transferred upward from the projection position back to the slide tray position.

With a slide 40 lowered to the projection position and referring now additionally to FIG. 4, the slide transfer shutter control arrangement 10 controls the opening of a generally planar shutter member 52 shown in the open projection position in FIG. 4. With the shutter member 52 in the open position, light rays emanating along an optical projection path in the direction of optical axis 54 from a projection lamp (not shown) pass through the plane of a condenser lens 56, then through the slide 40 and are appropriately focused by a lens (not shown) for projection of the slide information onto either a rear screen of the slide projector apparatus or onto an external projection surface. With the shutter member 52 in a closed position as illustrated in FIGS. 3, 5 and 6, the light from the projection lamp passing through the slide projection aperture 15 at the projection station is blocked as illustrated in FIGS. 3, 5 and 6.

If a slide is not present at the slide tray transfer position immediately above the slide transfer and shutter control arrangement 10, when the lifter arm 12 is lowered to the projection position, the shutter member 52 remains closed to block projection light. Specifically, and referring now additionally to FIG. 7 the slide transfer and shutter control arrangement 10 includes a slide sensor arm 58 (best seen in FIGS. 1 and 2), a slidable control arm 60 (best seen in FIGS. 3, 4 and 7) and an actuator cam 62 (best seen in FIG. 7) that is provided as an extending portion of the drive arm 14 in the vicinity of the slide sensor arm 58 and the slidable control arm 60. The slide sensor arm 58, the slidable control arm 60 and the actuator cam 62 cooperate to sense the presence of a slide as the drive arm 14 is lowered from the slide tray position to the projection position; the shutter member 52 being opened only if a slide 40 is present and positively sensed at the projection station.

The slidable control arm 60 is slidably mounted on the frame 24 for vertical sliding motion by two elongated openings 64, 66 formed through the slidable control arm 60 and two pins 68, 70 extending from the frame 24. A spring 72 is connected between the upper housing pin 68 and a hook extension 74 of the slidable control arm 60 to bias the slidable control arm 60 to an upward position. The slidable control arm 60 at the lower end includes an extending hook arm 76 that defines a general U-shaped receiving channel 78 and a cam or control surface at 80. The cam or control surface 80 controls the positioning of the shutter member 52 through camming action on an extending foot portion 82 of the shutter member 52.

The shutter member 52 is pivotally mounted by a rod 84 extending through the frame 24. The shutter member 52 is pivotally supported about the rod 84 such that the weight of the shutter member 52 biases the shutter member 52 to the open position of FIG. 4 without the intervention of the hook arm 76 or the slide sensor arm 58. Further in an alternative embodiment, a spring (not shown) is utilized to bias the shutter to the open position. Thus, with the slidable control arm 60 in the downward position of FIG. 4, the extending foot portion 82 of the shutter member 52 is free of the control surface 80 to allow pivoting of the shutter member 52 to the open position. Further, as the slidable control arm 60 moves upward, the control surface 80 acts against the foot portion 82 of the shutter member 52 to pivot the shutter member 52 to the closed position of FIGS. 3 and 6. As best seen in FIGS. 2, 3, 4 and 6, the shutter member 52 also includes an extending control arm 86 that cooperates with an extending control surface 88 of the slide sensor arm 58 (best seen in FIG. 2).

The slide sensor arm 58 is mounted for shifting translation with respect to the frame 24 by a rod 90 best seen in FIG. 2 and fixed to the slide sensor arm 58. The rod 90 is slidably supported in the frame 24. A coil spring 92 is disposed on the rod 90 and retained between the frame 24 and a split ring washer 94 fixed to the rod 90. The spring 92 biases the slide sensor arm 58 to the inward position shown in FIG. 2 so that the extending control surface 88 is in operative contact with the control arm 86 of the shutter member 52. With the extending control surface 88 of the slide sensor arm 58 in the inward position 52, the control arm 86 of the shutter member 52 is captured to hold the shutter member 52 to the closed position of FIGS. 3, 4 and 6 independent of the slidable control arm 60.

Thus, even with the slidable control arm in the lowered position such that the extended foot portion 82 of the shutter member 52 is free of the control surface 80, the slide sensor arm 58 controls the opening of the shutter member 52 as dependent upon the position of the slide sensor arm 58. The outer position 58a of the slide sensor arm 58 is shown in phantom FIG. 2 with the direction of translational movement of the slide sensor arm 58 shown by the arrow referred to generally at 96.

The slide sensor arm 58 includes an extending tapered nose portion that extends through an aperture 100 in the housing 24 when the slide sensor arm 58 is in the position of FIG. 2 so that the nose portion 98 extends into the slide gate area occupied by the slide 40 when the slide is lowered to the projection position. The nose portion 98 also includes a stop surface 102 that contacts the right frame wall 21 to define the limit of travel of the sensor arm 58 in the position shown in FIG. 2.

The slidable control arm 60 near the lower end thereof includes an extending receiver platform 106 that is positioned for engagement by the actuator cam 62 of the drive arm 14 so that the slidable control arm 60 moves coordinately with the drive arm 14 after engagement by the actuator 62. The extending receiver platform 106 of the slideable control arm 60 includes an upwardly extending edge surface 108 that is arranged to cause shifting translation of the slide sensor arm 58 by engagement with a receiver nose 110 of the slide sensor arm 58. With the slideable control arm 60 in the upper position, the edge surface 108 of the slideable control arm 60 through contact at receiver nose 110 positions the slide sensor arm 58 to the outward position to the left at 58a in FIG. 2. In the position 58a, the slide sensor arm 58 is in noninterfering relationship with the slide 40 being lowered to the projection station. The receiver nose 110 of the slide sensor arm 58 is dimensioned to be in contact with the edge surface 108 of the slideable control arms 60 and also with the actuator cam 62 of the drive control arm 14. The cam actuator 62 of the drive arm 14 includes a ramp camming surface 112. The receiver nose 110 of the slide sensor arm 58 includes a lower ramp receiver 116 that is engaged by the ramp camming surface 112 as the drive arm 14 moves up and down. The extending receiver platform 106 of the slidable control arm 60 also include a ramp camming surface 118 for engagement with the receiver nose 110 and the lower ramp receiver 116.

The face tension mechanism 50 includes a planar portion 120 that is rotatably mounted on the frame 24 by means of the rod 84. The rod 84 extends through apertures in the right and left lower extending arm portions 122, 124 respectively of the planar portion 120 (best seen in FIGS. 6 and 5). A coil spring 126 is carried by the rod 84 and includes two extending arms 128, 130. The extending arm 128 abuts against the base portion 120 and the arm 130 abuts the frame 24. The spring 126 biases the face tension mechanism 50 to the closed position with face tension applied as shown in FIG. 5.

A delay arm 132 controls the positioning of the face tension mechanism 50. The delay arm 132 is slidably mounted on the right frame wall 21 by means of upper and lower guide pins 134, 136 fixed to the wall 21 and extending through elongated upper and lower channels 138, 140 respectively provided through the delay arm 132. The delay arm 132 is movable vertically between upper and lower positions as defined by the channels 138, 140. The delay arm 132 includes a cam actuator 142 extending at right angles to the generally planar delay arm 132 that operates against the right extending arm 122 of the face tension assembly mechanism 50. The delay arm 132 is controlled for movement between the upper and lower positions by means of upper and lower extending hook portions 144, 146 respectively that extend at right angles to the generally planar delay arm 132. The extending hook portions 144, 146 are actuated by engagement of the drive arm 14; the drive arm 14 at 148 contacting the upper hook portion 144 to move the delay arm 132 to the upper position and the drive arm 14 at 150 contacting the lower hook portion 146 to move the delay arm 132 to the lower position. The delay arm 132 is mounted to the housing 24 with a predetermined frictional drag so as to require an actuating force to move the delay arm 132. The predetermined frictional drag mounting is provided by the retaining force supplied by the guide pins 134, 136 and an increased thickness portion 151 of the delay arm 132 formed along the surface contacting along the frame wall 21. Further the dimensioning of the guide pins 134, 136 for example by the length of widened shoulder portions 154, 156 of the pins 134, 136 respectively and the predetermined force with which the guide pins 134, 136 are inserted into the housing such as by a press fit operation or the like determine the amount of frictional drag. The diameter of the shoulder portions 154, 156 is greater than the diameter of the guide pin portions that extend into the frame and is less than the diameter of the heads of the guide pins 134, 136.

The actuator 142 of the delay arm 132 includes an actuator pin 152 fixed to the acuator 142 and extending at right angles thereto for contact with the leading edge 154 of the extending arm 122 of the face tension mechanism 50. Upon upward movement of the drive arm 14 as shown in FIG. 6, the delay arm 132 is lifted to the upward position and the actuator pin 152 operates against the leading edge 154 of the extending arm 122 to pivot the face tension mechanism 50 with attached face tension arms 42, 44, to the open position as shown in FIG. 6 with no face tension being applied. Further, as the drive arm 14 is lowered to the operative projection position, the delay arm 132 is moved to the downward position via the extending hook portion 146 and the face tension mechanism 50 with attached arms 42, 44 pivots under spring bias to the position shown in FIG. 5 to apply face tension to an inserted slide 40 as shown in FIG. 5.

The slide transfer and shutter control arrangement 10 includes upper and lower limit switches 156, 158 respectively as best seen in FIG. 1. The limit switches 156 and 158 provide control signals to the associated projection apparatus that controls operation of the slide transfer and shutter control arrangement 10. A switch actuator 164 of the drive arm 14 is positioned to contact a first movable contact arm 160 of the upper limit switch 156 as the drive arm 14 moves to the upward slide tray position. Similarly, the switch actuator 164 contacts the first movable contact arm 162 of the lower limit switch 158 as the drive arm 14 moves to the downward projection position. A second fixed contact arm 166 of the upper limit switch 156 is contacted by the movable contact arm 160 when the arm 160 is actuated by the drive arm 14. Similarly, a second fixed contact arm 168 of the lower limit switch 158 is contacted by the movable contact arm 162 when the arm 160 is actuated by the drive arm 14. Thus, the upper limit switch 156 provides a switch control signal to the associated projector apparatus when the drive arm 14 moves to the upward slide tray position and similarly the lower limit switch 158 provides a control signal when the drive arm 14 moves downward to the lower projection position.

Considering now the operation of the slide transfer shutter control arrangement 10, assume that the drive arm has moved downward to the projection position and lowered the slide in the slide tray by means of the lifter arm 12 and further that the contact arm 162 of the lower limit switch 158 has been contacted. In response to the lower limit switch 158, the associated projection apparatus deenergizes the motor 38. With the shutter 52 in the open position, the image of the projected slide is projected onto the appropriate projection viewing surface. After the associated projection apparatus has projected the slide and it is desired to project another slide, the projection apparatus energizes the motor 38 and the drive arm 14 moves upward and the shutter 52 is closed. As the drive arm 14 continues to move upward, the lifter 12 arm returns the slide to the slide tray. As the drive arm 14 approaches the upward position, the upper limit switch 156 is operated and the associated projection apparatus in response thereto deenergizes the motor 38. At this point the slide that has just been projected is returned to the slide tray. Next the associated projection apparatus rotates the slide tray to the slide tray position of the next slide to be projected and the slide tray is stopped. Upon stopping of the slide tray at the appropriate position, the associated control apparatus then energizes the motor 38 and the drive arm 14 moves downward to lower the slide into the projection position. As the drive arm 14 nears the lower projection position, the shutter 52 is opened. As the drive arm 14 actuates the lower limit switch 158, the projection apparatus deenergizes the motor 38 and the slide is projected.

With the drive arm 14 in operative positions such that no contact is made by the actuator cam 62 with either the slide sensor arm 58 or the slideable control arm 60, the slideable control arm 60 holds the shutter 52 in the closed position by means of the hook arm 76 engaging the hook portion 82 of the shutter 52 as shown in FIG. 3. Further, the slidable control arm 60 via the edge surface 108 positions the slide sensor arm 58 to the outward position 58a of FIG. 2 so that there is no interference by the nose portion 98 of the slide sensor arm 58 with a slide 40 as lowered into the slide gate projection position.

As the drive arm 14 moves downward toward the projection position, the actuator cam 62 contacts the receiver platform 106 of the slidable control arm 60 and moves the slidable control arm 60 toward the lower position. At the same time, the ramp camming surface 112 of the actuator 62 contacts the slide sensor arm 58 at 110 to maintain the slide sensor arm in the open outward position for noninterference with the lowered slide 40.

As the drive arm 14 and the slideable control arm 60 are moved further downward toward the projection position, the hook arm 76 of the slideable control arm 60 is moved free of the extending foot 82 of the shutter 52 and the slide sensor arm 58 now controls the opening of the shutter 52. If a slide 40 is present in the slide gate and is being lowered to the projection position, as the slide sensor arm 58 tends to move toward the inward position, the nose portion 98 contacts the edge of the slide 40 and applies side tension to the slide 40 in accordance with the bias applied through spring 92. Further, the shutter 52 moves to the open position with the extending control surface 88 of the slide sensor arm 58 not contacting the control arm 86 of the shutter 52.

Thus, with a slide 40 being sensed by the slide sensor arm 58, the shutter 52 is allowed to open. The drive arm 14 continues to the lowermost projection position and carries the slideable control arm 60 therewith whereupon the motor 38 is deenergized. Upon the return of the slide to the slide tray after projection, the motor 38 is energized and the drive arm 14 moves upward and the slidable control arm 60 also moves upward to close the shutter 52. Further the slide sensor arm 58 is moved to the outward position. As discussed before, the drive arm 14 continues upward as the lifter arm 12 transports the slide 40 back to the slide tray position whereupon the motor 38 is deenergized.

As explained hereinbefore, as the drive arm 14 reaches the upward slide tray position, the drive arm 14 at 148 contacts the upper hook portion 144 of the delay arm 142 and moves the delay arm 142 upward to open the face tension arms 44, 42. Correspondingly, as the drive arm 14 reaches the lower projection position, the drive arm 14 at 150 contacts the lower extending hook portion 146 of the delay arm 142 and closes the face tension arms 42, 44 to apply face tension to the slide 40.

In the situation where the slide tray is rotated to a slide tray position where no slide is contained thereat or also in the possible situation where a slide is incorrectly retained in the slide tray so as not to be free to move downward, the drive arm 14 upon being lowered moves downward to move the slidable control arm 60 to the lower position so as to move the hook arm 76 free of the foot portion 82 of the shutter. However, with no slide present in the slide gate, and with the slide sensor arm 58 being free to move in accordance with spring bias to the inward position due to the downward positioning of the actuator cam 62 and the slidable control arm 60, the extending control surface 88 of the slide sensor arm 58 engages the control arm 86 of the shutter 52. Accordingly, the shutter 52 remains in the closed position as shown for example in FIG. 2. Thus the projection surface remains dark and no annoying bright light is projected on the projeciton viewing surface when no slide is present for projection when the slide transfer and shutter control arrangement 10 is operated to the projection position.

In accordance with further important aspects of the present invention, the slide transfer and shutter control arrangement 10 includes a tray release mechanism 170 that is coordinated with the operation of the drive arm 14. Specifically, the tray release mechanism 170 includes a generally planar slider arm 172 and a downwardly extending control arm 174 extending at right angles to the slider arm 172. Further at the end of the slider arm 172 opposite the control arm 174, a wire release control actuator 176 is provided that extends at right angles to the slider element 172.

Referring to FIG. 2, the wire release control actuator 176 is arranged to operatively engage a downwardly extending tray release wire at 178 of a conventional slide tray release mechanism generally referred to at 180. The general outline of a conventional slide tray as positioned in operative relationship to the slide transfer and shutter control arrangement is shown generally at 182. When the wire release control actuator 176 engages the release wire 178 and moves the release wire 178 to the left in FIG. 2, the slide tray release arrangement 180 is operated to allow rotation of the slide tray 182 within its housing. Correspondingly with the release wire 178 in a position to the right in FIG. 2, the tray is locked against slide tray movement with respect to the slide tray housing.

The tray release mechanism 170 is slidably mounted on the frame portion 20 by means of two guide pins 184, 186 attached to the frame 20 and elongated channels 188, 190 provided in the slider element 172. The tray release mechanism 170 further includes a tray presence sensor button 192 carried on the free end of a spring arm 194 of the tray release mechanism 170. The spring arm 194 is pivotally mounted at the end opposite the sensor button 192 at the guide pin 186. The spring arm 194 is biased upwardly in FIG. 1 by a coil spring 196 disposed about an upwardly extending guide pin 198. The sensor button 192 includes a receiving passage formed therein to accept the guide pin 198.

The drive arm 14 includes a tapered channel 200 functioning as a camming surface to move the slider element 172 to the right in FIG. 1 as the tapered channel 200 engages the control arm 174 of the slider element 172. The slider element 172 is biased to the left in FIG. 1 by a spring 202 connected between the control arm 174 and the frame portion 20. The spring arm 194 near the sensor button 192 includes an extending hook arm 204 arranged to engage a notched portion 206 of an upwardly extending wall 208 of the slider element 172.

With the sensor button 192 in the upper uncontacted position, the slider element 172 is free to move between the left and right positions in FIG. 1. With the tray presence sensor button 192 being contacted by the weight of a slide tray positioned atop the slide transfer and shutter control arrangement 10, the sensor button 192 is depressed downwardly against the wall 208. The slider element 172 is still free to be moved to the right in FIG. 1. However, as the slider element is moved to the right, the hook arm 204 engages the notched portion 206 of the wall 208 and locks the slider element 172 against further movement to the left position as long as the sensor button 192 is retained in the downward position.

Considering now the operation of the tray release mechanism 170, with a slide tray 182 positioned atop the slide transfer and shutter control arrangement 10 and with the slider element 172 biased to the leftward position, the slide tray 182 moves the sensor button 192 to the downward position with the hook arm 204 contacting the top edge of the wall 208. As the motor 38 is energized and the drive control arm 14 moves upwardly, the slider element 172 is moved to the right in FIG. 1 as the control arm 174 of the slider element 172 is contacted by the camming surface of the tapered channel 200. Consequently, the slider element 172 is moved to the extreme right position as the drive arm 14 moves to the upward slide position and the motor 38 is deenergized. As the slider element 172 moves to the right position, the wire release control actuator 176 retracts the release wire 178 and unlocks the slide tray 182 to allow rotation of the slide tray by the associated projection apparatus.

As the drive arm 14 is operated thereafter for projecting various slides and transferring various slides, the slider element 172 is maintained in the slide tray release position with the release wire 178 retracted to the leftward position in FIG. 2 corresponding to a rightward position of the slider element 172 in FIG. 1. The slide tray is subsequently maintained in the released position for rotation as long as the slide tray 182 is maintained in position atop the projection apparatus so as to maintain the sensor button 192 depressed.

If the slide tray 182 is removed and lifted from the sensor button 192, the slider element 172 is released and the slider element 172 under spring bias moves to the leftward position in FIG. 1 to the right in FIG. 2. When the slide tray 182 is again positioned atop the slide transfer and shutter control arrangement 10, the slide tray is in the locked position with the release wire 178 in the rightward position in FIG. 2 and the slider element 172 in the leftward position in FIG. 1. Again as the drive arm 14 moves to the upward slide tray transfer position, the slider element 172 is moved to the rightward in FIG. 1 to retract the release wire 178 to allow slide tray rotation. With continued presence of a slide tray to depress the sensor button 192, the slider element 172 remains locked in the tray release position.

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. Apparatus for use with slide projector apparatus comprising:
   a frame defining a slide projection station and a slide projection aperture being aligned with a predetermined optical projection path;
   stationary guide means provided on said frame for generally aligning a slide received at said slide projection station;
   a shutter member including a generally planar portion being pivotally mounted on said frame for movement between a first closed position blocking said optical projection path and a second open position not blocking said optical projection path, said shutter member including a shutter control arm extending generally perpendicularly from said generally planar portion in fixed relation thereto and being movable therewith;
   a slide sensor arm being mounted with respect to said frame for shifting translation thereto, the direction of said shifting translation being generally in the direction defined by the width dimension of a slide received at said slide projection station, said slide sensor arm including a sensor portion extending from said slide sensor arm and into said slide projection aperture when said slide sensor arm is shifted to a first position, said slide sensor arm further including an extending tab portion forming a notch with said slide sensor arm for engaging said shutter control arm when said slide sensor arm is shifted to said first position and for releasing said shutter control arm when said slide sensor arm is shifted to a second position, said slide sensor arm with said sensor portion and said shutter control arm engaging portion comprising a generally elongated member, said sensor portion and said shutter control arm engaging portion extending from said slide sensor arm in the direction of shifting translation and being in fixed relation thereto and being movable therewith; and
   slide sensor arm biasing means for biasing said slide sensor arm to said first position,
   said slide sensor arm being shifted by said biasing means to said first position when no slide is present at said slide projection station to maintain said shutter member in said first closed position, said slide sensor arm not being shifted to said first position when a slide is present at said slide projection station so as to release said shutter member to said second open position, said shutter member being pivotable about an axis spaced apart from and in the same direction as said direction of shifting translation of said slide sensor arm, said shutter control arm being engaged by said tab portion of said shutter control arm engaging portion and being trapped below said shutter control arm engaging portion in said formed notch when said slide sensor arm is in said first position.

2. The apparatus of claim 1 further comprising means for transferring a slide to and from a predetermined slide tray position immediately above and aligned with said slide projection aperture and said slide projection station, said slide transferring means comprising a movable lifter arm movable in said slide projection aperture to transfer a slide between an upper slide tray position and a lower slide projection position.

3. The apparatus of claim 2 wherein said sensor portion of said slide sensor arm comprises a ramp surface oriented so as to form an angle with the lower corner of a slide being transferred between said upper slide tray position and said lower slide projection position.

4. Apparatus for use with slide projector apparatus comprising:
   a frame defining a slide projection station and a slide projection aperture being aligned with a predetermined optical projection path;
   stationary guide means provided on said frame for generally aligning a slide receiver at said slide projection station;
   a shutter member including a generally planar portion being movable on said frame between a first closed position blocking said optical projection path and a second open position not blocking said optical projection path, said shutter member including a shutter control arm extending from said generally planar position;
   a slide sensor arm being mounted with respect to said frame for shifting translation thereto, the direction of said shifting translation being generally in the direction defined by the width dimension of a slide received at said slide projection station, said slide sensor arm including a sensor portion extending from said slide sensor arm and into said slide projection aperture when said slide sensor arm is shifted to a first position, said slide sensor arm further including means for engaging said shutter control arm when said slide sensor arm is shifted to said first position and for releasing said shutter control arm when said slide sensor arm is shifted to a second position;
   slide sensor arm biasing means for biasing said slide sensor arm to said first position, said slide sensor arm being shifted by said biasing means to said first position when no slide is present at said slide projection station to maintain said shutter member in said first closed position, said slide sensor arm not being shifted to said first position when a slide is present at said slide projection station so as to release said shutter member to said second open position;
   means for transferring a slide to and from a predetermined slide tray position immediately above and aligned with said slide projection aperture and said slide projection station, said slide transferring means comprising a movable lifter arm movable in said slide projection aperture to transfer a slide between an upper slide tray position and a lower slide projection position; and
   a slidable control arm slidably mounted for movement between an upper position and a lower position with respect to said frame and means for biasing said slidable control arm to said first upper position, said slidable control arm including a shutter member actuator portion, said shutter member further including receiver means for cooperating with said shutter member actuator portion, said shutter member actuator portion engaging said receiver means of said shutter member to close said shutter member when said slidable control arm is moved to said upper position and releasing said receiver means to allow said shutter member to open when said slidable control arm is moved to said lower position.

5. The apparatus of claim 4 wherein said slidable control arm further includes a cam actuator for engaging said slide sensor arm, said slide sensor arm further including a cam receiver for cooperation with said cam actuator, said cam actuator being positioned to shift said slide sensor arm to said second position when said slidable control arm is in said upper position.

6. The apparatus of claim 5 wherein said slidable control arm further includes drive actuator receiving means, said slide transferring means further comprises actuator means movable with said lifter arm and positioned in a predetermined orientation with respect to said lifter arm, said actuator means of said slide transferring means engaging said drive actuator receiving means when said lifter arm is at a predetermined position above said slide projection position, said slideable control arm moving coordinately with said lifter arm after engagement with said drive actuator receiving means, movement of said lifter arm toward said lower slide projection position moving said slidable conitrol arm to release said receiver means of said shutter member.

7. The apparatus of claim 6 wherein said slide transferring means further comprises electrically controlled drive means for moving said lifter arm over a reciprocative path between said slide tray position and said slide projection position, upper and lower limit switches, and a switch actuator movable with said lifter arm, said upper limit switch being disposed to be actuated by said switch actuator when said lifter arm is moved to said slide tray position, said lower limit switch being disposed to be actuated by said switch actuator when said lifter arm is moved to said slide projection position.

8. The apparatus of claim 7 wherein said electrically controlled drive means comprises a drive motor, a drive train coupled to said drive motor, and a rotatable level wind screw operatively coupled to and being driven by said drive train, said lifter arm including a threaded passage for engagement by said level wind screw.

9. The apparatus of claim 6 wherein said cam actuator of said slidable control arm is disengaged from said cam receiver of said slide sensor arm when said slidable control arm is moved coordinately with said lifter arm toward said slide projection station position whereupon said slide sensor arm is freed for movement from said second position toward said first position in accordance with said slide sensor arm biasing means.

10. The apparatus of claim 9 further comprising face tension means for selectively applying face tension to a slide received in said slide projection aperture, said face tension means comprising two movable face tension arms cooperatively positioned with respect to said stationary guide means, said face tension arm being movable between a first closed face tension applied position adjacent said stationary guide means and a second open face tension removed position spaced apart from said stationary guide means, said face tension means further comprising means for biasing said face tension arm toward said first closed position and a face tension actuator arm, said face tension means further comprising a generally planar portion connecting said two face tension arms and a control arm extending from said generally planar portion connecting said two face tension arms and a control arm extending from said generally planar portion, said face tension actuator arm including a face tension actuator portion arranged for engagement with said control arm, said face tension actuator arm being slidably mounted on said frame for movement between an upper position and a lower position, said face tension actuator arm further including upper and upper engagement extensions, said lifter arm further including means for engaging said upper and lower engagement extensions, said lifter arm when moved to said lower position engaging said lower engagement extension of said face tension actuator arm to move said face tension actuator arm to said lower position and to move said face tension arms to said first closed face tension applied position, said lifter arm when moved to said upper position engaging said upper engagement extension of said face tension actuator arm to move said face tension controlling arm to said upper position and to move said face tension arms to said second open face tension removed position.

11. Apparatus for use with slide projector apparatus comprising:
   a frame defining a slide projection station and a slide projection aperture being aligned with a predetermined optical projection path;
   stationary guide means provided on said frame for generally aligning a slide received at said slide projection station;
   a shutter member including a generally planar portion being movable on said frame between a first closed position blocking said optical projection path and a second open position not blocking said optical projection path, said shutter member including a shutter control arm extending from said generally planar portion;
   a slide sensor arm being mounted with respect to said frame for shifting translation thereto, the direction of said shifting translation generally in the direction defined by the width dimension of a slide received at said slide projection station, said slide sensor arm including a sensor portion extending from said slide sensor arm and into said slide projection aperture when said slide sensor arm is shifted to a first position, said slide sensor arm further including means for engaging said shutter control arm when said slide sensor arm is shifted to said first position and for releasing said shutter control arm when said slide sensor arm is shifted to a second position;
   slide sensor arm biasing means for biasing said slide sensor arm to said first position, said slide sensor arm being shifted by said biasing means to said first position when no slide is present at said slide projection station to maintain said shutter member in said first closed position, said slide sensor arm not being shifted to said first position when a slide is present at said slide projection station so as to release said shutter member to said second open position;
   means for transferring a slide to and from a predetermined slide tray position immediately above and aligned with said slide projection aperture and said slide projection station, said slide transferring means comprising a movable lifter arm movable in said slide projection aperture to transfer a slide between an upper slide tray position and a lower slide projection position; and
   slide tray release means for selectively actuating a release wire of a conventional slide tray release mechanism, said slide transferring means further comprising actuator means movable with said lifter arm, said slide tray release actuating means being engaged by said actuator means and being positioned to a first tray release position to actuate said slide tray release mechanism when said slide transferring means is in said slide tray position.

12. The apparatus of claim 11 wherein said slide tray release actuating means comprises means for selectively locking said slide tray release actuating means in said first position wherein the slide tray release mechanism is actuated, said selective locking means comprising slide tray presence sensor means for locking said slide tray release actuating means in said first position when said slide tray release actuating means is engaged by said actuator means and when a slide tray is sensed by said slide tray presence sensor means.

13. The apparatus of claim 12 wherein said slide tray release actuating means comprises a first arm slidably mounted with respect to said frame and positionable between said first tray release position and a second position wherein the slide tray release mechanism is not actuated, said tray release actuating means further comprising means for biasing said first arm to said second position, said first arm including an extending portion for engagement by said actuator means, said first control arm further including an extending actuator portion for engaging the release wire of the slide tray release mechanism.

14. The apparatus of claim 13 wherein said selective locking means comprises a second arm that is pivotally mounted with respect to said frame, said second arm including an extending locking tab, said first arm further including an upstanding wall having a notched position, said second arm when pivoted to a first locking position engaging said upstanding wall and engaging said notched portion of said upstanding wall when said first arm is moved to said first position to lock said slide tray release actuating means in said first position.

15. The apparatus of claim 14 wherein said slide tray presence sensor means comprises an actuator and means for biasing said second arm and said actuator to a second unlocking position, said actuator being engaged by a slide tray positioned thereon to move said second arm to said first locking position.

* * * * *

UNITED STATES PATENT AND TRADEMARK OFFICE
CERTIFICATE OF CORRECTION

PATENT NO. : 4,429,963
DATED : February 7, 1984
INVENTOR(S) : Nicholas Mischenko It is certified that error appears in the above-identified patent and that said Letters Patent are hereby corrected as shown below:

Column 1, line 38, correct spelling of "Houseknecht";

Column 2, line 1, change "slidable" to "slidably";

Column 3, line 24, change "poriton" to "portion";

Column 3, line 60, after "arrangement", insert --of--;

Column 3, line 68, after "Next", insert a comma (,);

Column 4, line 21, change "tensions" to "tension";

Column 4, line 26, delete "an", and insert --the--;

Column 5, line 57, after "phantom", insert --in--;

Column 6, lines 7, 11, 12, and 19, change "slideable" to "slidable";

Column 6, line 20, change "arms" to "arm";

Column 6, line 27, change "include" to "includes";

Column 6, line 33, before "right", delete "the";

Column 6, line 35, change "FIGS. 6 and 5" to "FIGS. 5 and 6";

Column 8, line 1, change "lifter 12 arm" to "lifter arm 12";

Column 8, line 18, change "positions" to "position";

UNITED STATES PATENT AND TRADEMARK OFFICE
CERTIFICATE OF CORRECTION

PATENT NO. : 4,429,963

DATED : February 7, 1984

INVENTOR(S) : Nicholas Mischenko

It is certified that error appears in the above-identified patent and that said Letters Patent are hereby corrected as shown below:

Column 8, lines 20, 21, 38, 40, and 55, change "slideable" to "slidable";

Column 9, line 7, delete "thereat";

Column 9, line 21, after "shown", insert a comma (,); and after "example", insert a comma (,);

Column 9, line 23, change "projeciton" to "projection"

In Claim 4, line 7, change "receiver" to "received";

In Claim 4, line 15, change "position" to "portion";

In Claim 6, line 13, change "conitrol" to "control";

In Claim 10, lines 6 and 11, change "arm" to "arms";

In Claim 10, line 24, delete "upper" and insert --lower--; and

UNITED STATES PATENT AND TRADEMARK OFFICE
CERTIFICATE OF CORRECTION

PATENT NO. : 4,429,963

DATED : February 7, 1984

INVENTOR(S) : Nicholas Mischenko

It is certified that error appears in the above-identified patent and that said Letters Patent are hereby corrected as shown below:

In Claim 14, line 5, change "position" to "portion".

Signed and Sealed this

Twelfth Day of February 1985

[SEAL]

Attest:

DONALD J. QUIGG

*Attesting Officer*  *Acting Commissioner of Patents and Trademarks*